US008763919B1

(12) United States Patent
 Washington

(10) Patent No.: US 8,763,919 B1
(45) Date of Patent: Jul. 1, 2014

(54) METHOD AND SYSTEM FOR GENERATING MACHINE-READABLE CODE

(71) Applicant: Xerox Corporation, Norwalk, CT (US)

(72) Inventor: John R. Washington, Hitchin (GB)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 13/896,362

(22) Filed: May 17, 2013

(51) Int. Cl.
 *G06K 19/06* (2006.01)
(52) U.S. Cl.
 CPC ............................... *G06K 19/06112* (2013.01)
 USPC ...................................... 235/494; 235/462.01
(58) Field of Classification Search
 CPC .................... G06F 17/30879; G06F 17/30725; G06K 7/10; G06K 15/02; G06K 19/06028; G06K 19/06037; G06K 7/1443; G06K 7/1447; G06K 9/2063; G06K 9/3216
 USPC ........... 235/375, 462.01, 462.08, 462.09, 494
 See application file for complete search history.

(56) References Cited

U.S. PATENT DOCUMENTS

| 7,523,864 | B2 * | 4/2009 | Manheim | 235/462.01 |
| 8,544,741 | B2 * | 10/2013 | O'Keefe | 235/437 |
| 2005/0067496 | A1 * | 3/2005 | Yen et al. | 235/462.08 |
| 2007/0031046 | A1 * | 2/2007 | Onishi | 382/232 |
| 2007/0199992 | A1 * | 8/2007 | Manheim | 235/462.01 |
| 2008/0235263 | A1 * | 9/2008 | Riaz et al. | 707/102 |
| 2009/0030544 | A1 * | 1/2009 | Floeder et al. | 700/122 |
| 2009/0161141 | A1 * | 6/2009 | Shobu | 358/1.14 |
| 2010/0072269 | A1 * | 3/2010 | Scott et al. | 235/375 |
| 2010/0315681 | A1 * | 12/2010 | Misawa et al. | 358/1.15 |
| 2011/0085198 | A1 * | 4/2011 | Son et al. | 358/1.15 |
| 2012/0175419 | A1 * | 7/2012 | O'Keefe | 235/437 |

\* cited by examiner

*Primary Examiner* — Tuyen K Vo

(57) ABSTRACT

Method, system, and computer program product for generating a machine-readable code for an electronic document are disclosed. A user interface receives an input for defining one or more areas of interest in the electronic document. One or more location identifiers are determined corresponding to each of the one or more areas of interest. The machine-readable code is then generated for the electronic document based on the one or more location identifiers. Further, the machine-readable code is embedded in the electronic document. The machine-readable code when scanned and decoded enables extracting of one or more descriptors (e.g., text written in various locations specified by the one or more location identifiers). The one or more descriptors are used for at least one of naming the electronic document or determining the one or more attributes of the message.

19 Claims, 7 Drawing Sheets

METHOD AND SYSTEM FOR GENERATING MACHINE-READABLE CODE

TECHNICAL FIELD

The presently disclosed embodiments are related to electronic documents. More particularly, the presently disclosed embodiments are related to a technique for generating a machine-readable code for an electronic document.

BACKGROUND

Documents are available for surveys, academic assessments, admissions, registration, customer-related queries, etc., may include, but are not limited to, a printed form or a handwritten form. The user fills the information in the available fields of the document. The document may then be scanned to generate an electronic document (e.g., a digital image). The information filled by the user may then be extracted from the electronic document. However, while extracting information from a set of filled electronic documents, at times, it becomes tedious to individually select the desired user-related information from each electronic document. The set of filled electronic documents may be identical or distinct. Hence, it is required that the information from the relevant fields only is extracted and not from all the fields available on the document.

SUMMARY

According to embodiments illustrated herein, there is provided a method for generating a machine-readable code utilizable for naming an electronic document. The method is implementable on a computing device. The method includes receiving an input for defining one or more areas of interest in the electronic document. One or more location identifiers are determined corresponding to each of the one or more areas of interest. The machine-readable code for the electronic document is then generated based on the one or more location identifiers. Further, the machine-readable code is embedded in the electronic document. The machine-readable code is utilizable for extracting one or more descriptors from the one or more location identifiers. The one or more descriptors are used for at least naming the electronic document.

According to embodiments illustrated herein, there is provided a system to generate a machine-readable code utilizable for naming an electronic document. The system includes a user interface manager, a location module, and a code generation module. The user interface manager is configured to receive an input for defining one or more areas of interest in the electronic document. The location module configured to determine one or more location identifiers corresponding to each of the one or more areas of interest. The code generation module configured to generate the machine-readable code for the electronic document based on the one or more location identifiers. A code positioning module configured to embed the machine-readable code in the electronic document. The machine-readable code is utilizable for extracting one or more descriptors from the one or more location identifiers. Further, the one or more descriptors are utilized for at least naming the electronic document.

According to embodiments illustrated herein, there is provided a computer program product for use with a computer. The computer program product comprises a computer-usable data carrier storing a computer-readable program code for generating a machine-readable code utilizable for naming an electronic document. The computer-readable program code comprises a program instruction means for receiving an input for defining one or more areas of interest from the electronic document. The computer-readable program code comprises a program instruction means for determining one or more location identifiers corresponding to each of the one or more areas of interest. The computer-readable program code comprises a program instruction means for generating the machine-readable code for the electronic document based on the one or more location identifiers. Further, the computer readable medium comprises program instruction means to embed the machine-readable code in the electronic document. The machine-readable code is utilizable for extracting one or more descriptors from the one or more location identifiers. Further, the one or more descriptors are utilized for at least naming the electronic document.

BRIEF DESCRIPTION OF DRAWINGS

The accompanying drawings illustrate various embodiments of systems, methods, and various other aspects of the invention. Any person having ordinary skills in the art will appreciate that the illustrated element boundaries (e.g., boxes, groups of boxes, or other shapes) in the figures represent one example of the boundaries. It may be that in some examples, one element may be designed as multiple elements or that multiple elements may be designed as one element. In some examples, an element shown as an internal component of one element may be implemented as an external component in another, and vice versa. Furthermore, elements may not be drawn to scale.

Various embodiments will hereinafter be described in accordance with the appended drawings, which are provided to illustrate, and not to limit the scope in any manner, wherein like designations denote similar elements, and in which.

DETAILED DESCRIPTION

Figure 1:
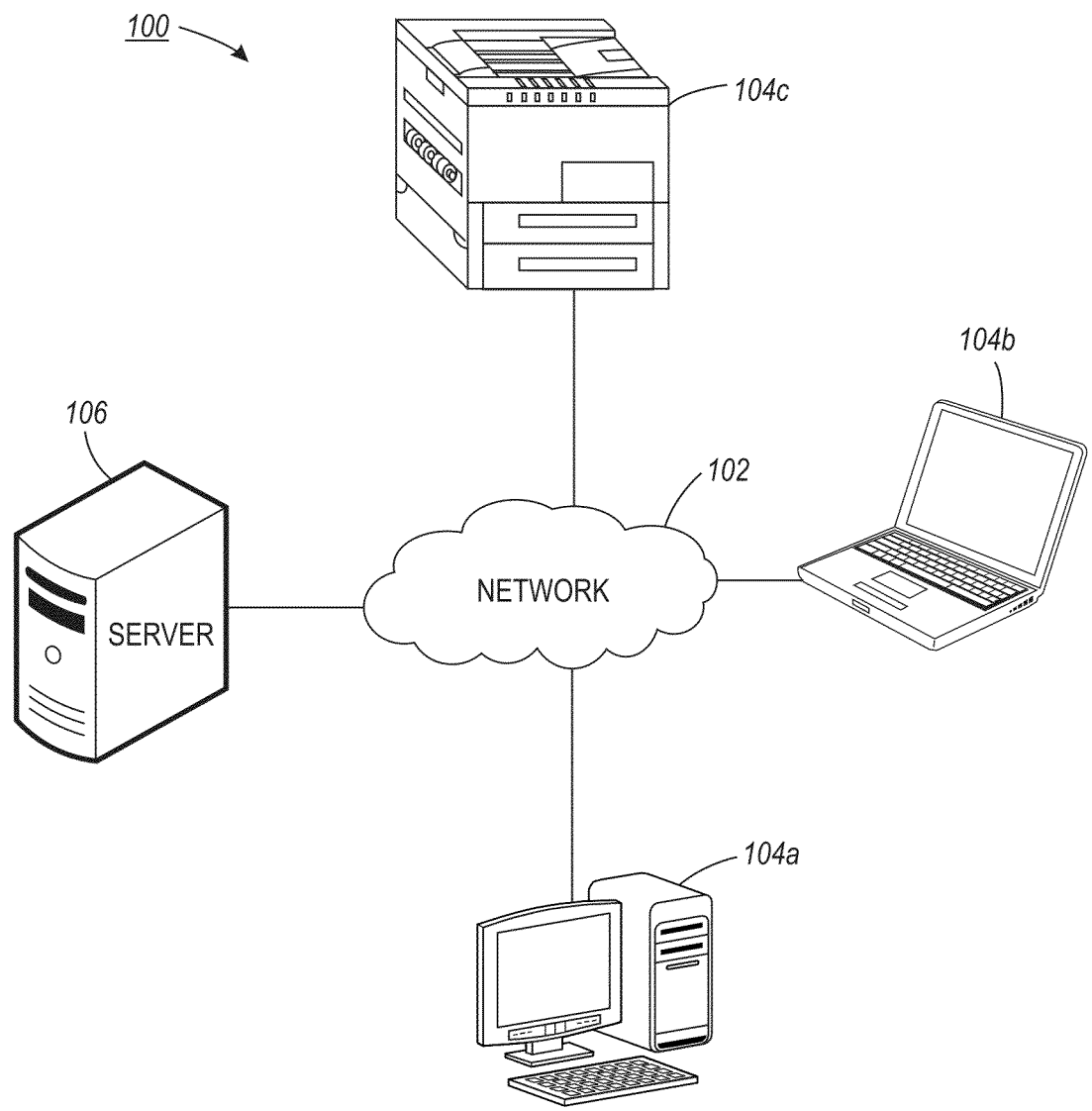
FIG. 1 is a block diagram illustrating a system environment in accordance with at least one embodiment.

The present disclosure is best understood with reference to the detailed figures and description set forth herein. Various embodiments are discussed below with reference to the figures. However, those skilled in the art will readily appreciate that the detailed descriptions given herein with respect to the figures are simply for explanatory purposes as methods and systems may extend beyond the described embodiments. For example, the teachings presented and the needs of a particular application may yield multiple alternate and suitable approaches to implement functionality of any detail described herein. Therefore, any approach may extend beyond the particular implementation choices in the following embodiments described and shown herein.

References to "one embodiment", "an embodiment", "one example", "an example", "for example" and so on, indicate that the embodiment(s) or example(s) so described may include a particular feature, structure, characteristic, property, element, or limitation, but that not every embodiment or example necessarily includes that particular feature, structure, characteristic, property, element, or limitation. Furthermore, repeated use of the phrase "in an embodiment" does not necessarily refer to the same embodiment.

DEFINITIONS

The following terms shall have, for the purposes of this application, the respective meanings set forth below.

"Scanning" refers to a technique of recording an image as digital data in any format, thereby creating a file.

A "machine-readable code" (MRC) refers to a code that is readable by an electronic machine equipped with appropriate scanning apparatus and/or image processing algorithms. Examples of the MRC include, but are not limited to, a one-dimensional barcode, such as a Universal Product Code (UPC); a two-dimensional bar code, such as a Quick Response (QR) code and a High Capacity Color Barcode; and a MaxiCode.

A "multifunction device" (MFD) refers to a device that can perform multiple functions. Examples of the functions include, but are not limited to, printing, scanning, copying, faxing, emailing, and the like.

An "electronic document" or "scanned document" refers to information recorded in a manner that requires a computing device or other electronic device to display, interpret, and process it. Electronic documents are intended to be used in either an electronic form or as printed output. In an embodiment, the electronic document includes one or more of text (handwritten or typed), image, symbols, and so forth. In an embodiment, the electronic document is obtained by scanning a document using a suitable scanner or an MFD. In an embodiment, the scanned document is a digital image. The digital image refers to a collection of data, including image data in any format, retained in an electronic form. The digital image can contain one or more pictorial, symbols, text, line art, blank, or non-printed regions, etc. The digital image can be stored in various file formats, such as, JPG or JPEG, GIF, TIFF, PNG, BMP, RAW, PSD, PSP, PDF, and the like. Hereinafter, the terms "electronic document", "scanned document", "image", and "digital image" are interchangeably used without deviating from the scope of the ongoing description.

A "computing device" refers to a computer, a device including a processor/microcontroller and/or any other electronic component, device or system that performs one or more operations according to one or more programming instructions. Examples of the computational device include, but are not limited to, a desktop computer, a laptop, a personal digital assistant (PDA), a Smartphone, an MFD, and the like. The computational device is capable of accessing (or being accessed over) a network (e.g., using wired or wireless communication capabilities).

A "network" refers to a medium that interconnects a server and various computational devices. Examples of the network include, but are not limited to, LAN, WLAN, MAN, WAN, and the Internet. Communication over the network may be performed in accordance with various communication protocols such as Transmission Control Protocol and Internet Protocol (TCP/IP), User Datagram Protocol (UDP), and IEEE 802.11n communication protocols.

A "descriptor" refers to information contained or derived from one or more locations in an electronic document. In an embodiment, the descriptors corresponds to the text fields that further correspond, but not limited, to various user-related information fields and various subject matter related fields, such as, title field, and content field. In alternate embodiment, the descriptors are derived from one or more predefined locations in the electronic document.

A "message" refers to any arrangement whereby digital data relating to images and/or text is conveyed to at least one recipient. Various examples of the message include, but are not limited to, e-mail, multimedia message (MMS), FAX, or any customizable electronic media capable of conveying images and/or text.

"Embed" or "embedding" refers to adding data to an image file (in any format and/or state of compression).

FIG. 1 is a block diagram illustrating a system environment 100 in accordance with at least one embodiment. Various embodiments of the methods and systems for generating an MRC for an electronic document can be implemented in the system environment 100. The system environment 100 includes a network 102. The system environment 100 further includes a desktop computer 104a, a laptop 104b, an MFD 104c, and a server 106.

A user operating the desktop computer 104a or the laptop 104b is capable of accessing the MFD 104c and/or the server 106 through the network 102. A functionality of generating the MRC for the electronic document can be implemented on at least one of the desktop computer 104a, the laptop 104b, the MFD 104c, and the server 106. In an embodiment, for example, the desktop computer 104a and/or the laptop 104b are capable of executing an application for generating the MRC for the electronic document. In another embodiment, the application is hosted by the server 106 and the desktop computer 104a and/or the laptop 104b are capable of accessing the application over the network 102. In another embodiment, the MFD 104c is adapted to generate the MRC for the scanned documents (e.g., digital images).

In an embodiment, the MFD 104c is capable of printing the electronic document with embedded MRC. In another embodiment, the MFD 104c embeds the MRC at the time of rasterizing. Further, the MFD 104c is capable of scanning any document with embedded MRC.

In an embodiment, one or more of the desktop computer 104a, the laptop 104b, the MFD 104c, and the server 106 may also be capable of executing the application for decoding the MRC present in a scanned document to determine a file name for the scanned document.

Figure 2A:
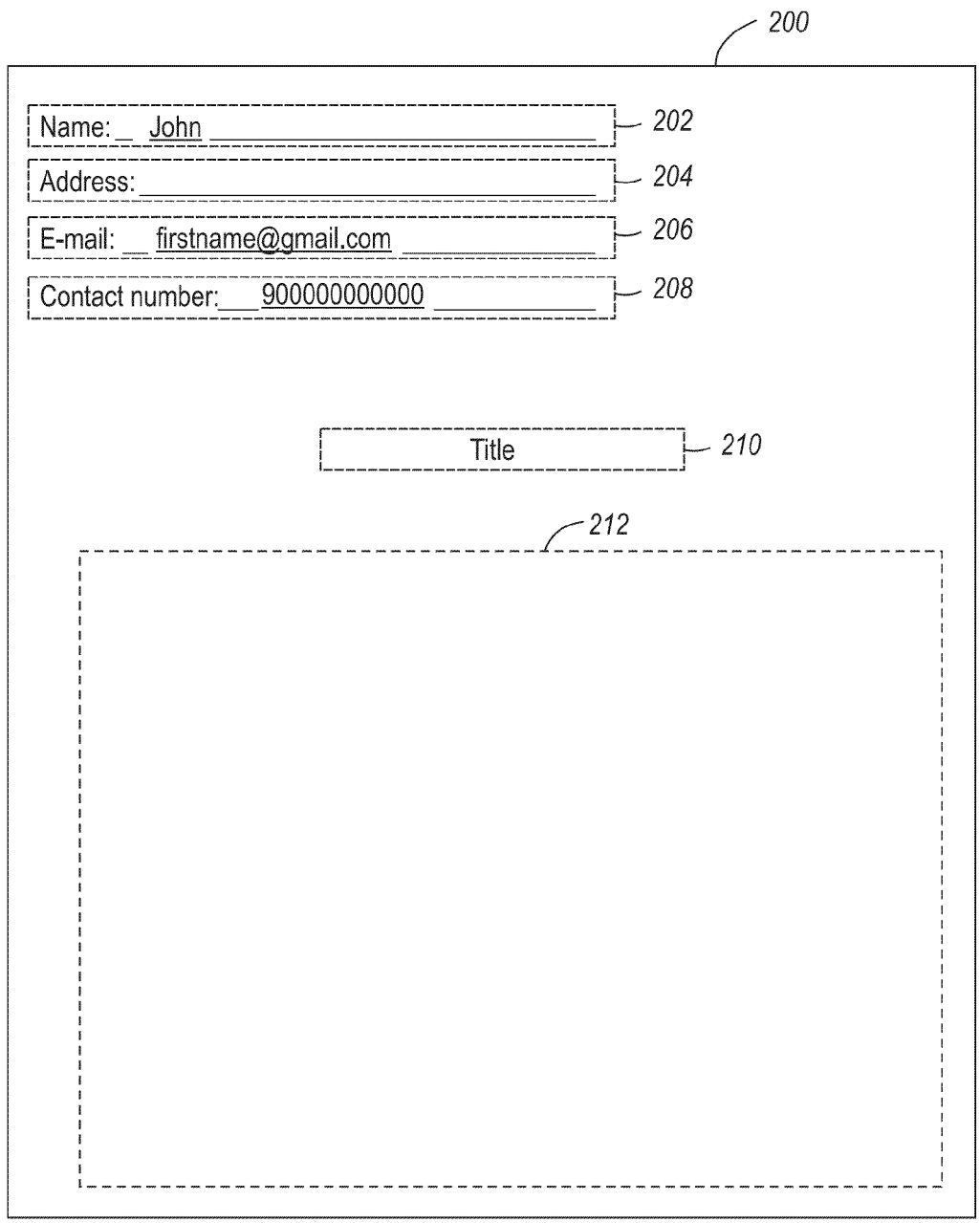
FIG. 2A depicts a layout of an electronic document in accordance with at least one embodiment.

FIG. 2A depicts the layout of an electronic document 200 in accordance with at least one embodiment. The layout of the electronic document 200 includes user-related information fields, such as name 202, address 204, email 206, and contact number 208. The layout further includes subject matter related fields, such as a title field 210 and a content field 212. The user-related information fields may also contain fields other than the fields depicted in the electronic document 200. The title 210 contains a suitable title for content in the electronic document 200. The content 212 contains various details including, but not limited to, various text, symbols, pictures, and so forth. Further, the ongoing description is not limited with respect to the content in the field content 212.

The positions of the various fields, such as, the user-related information fields, shown by 202-208, the title 210, and the content 212, may vary in different electronic documents without departing from the scope of the ongoing description. Further, it is understood by a person having ordinary skill in the art that all of the aforementioned fields may not appear together in other electronic documents.

Figure 2B:
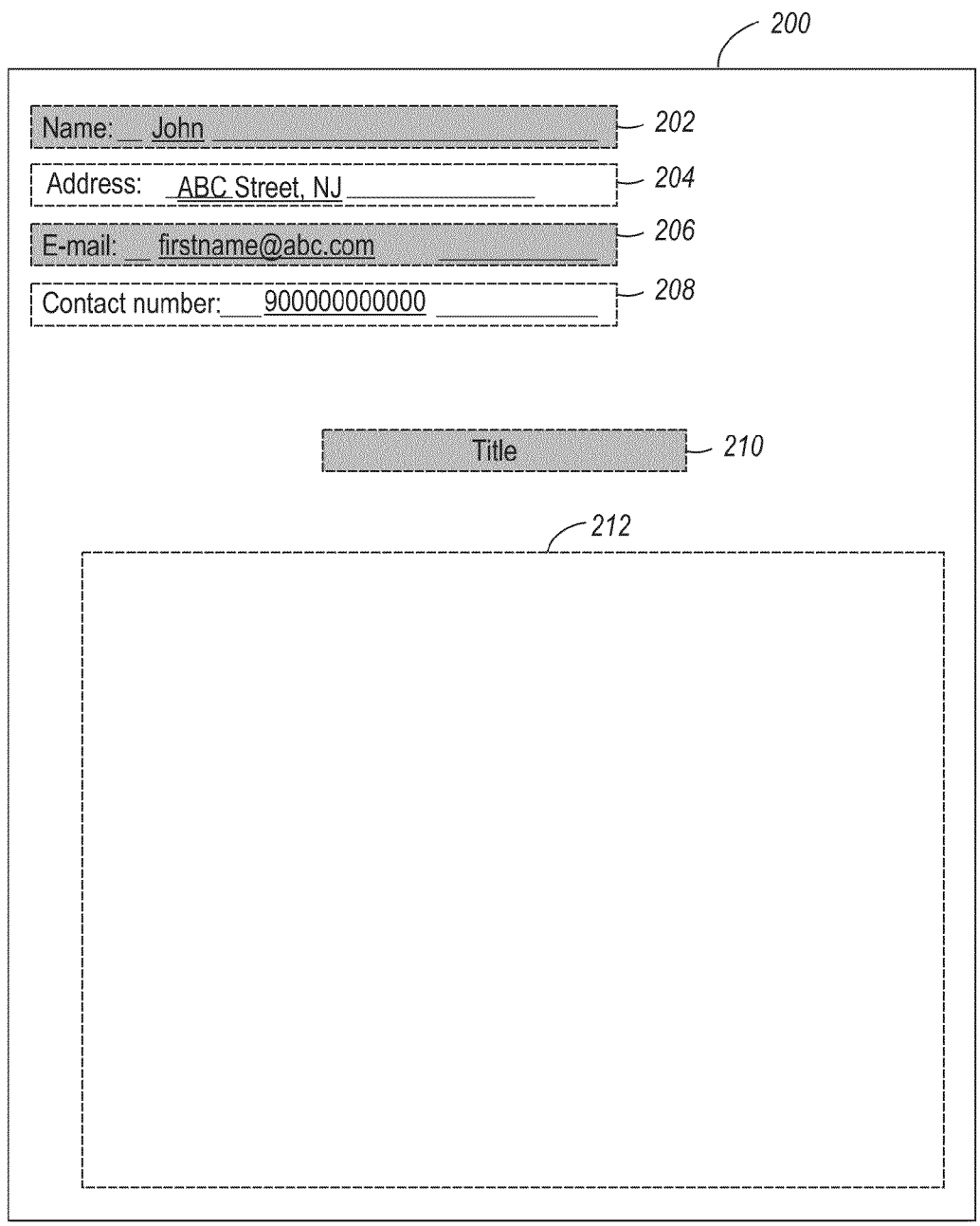
FIG. 2B depicts a layout of the electronic document with highlighted areas of interest in accordance with at least one embodiment.

FIG. 2B depicts a layout of the electronic document with highlighted areas of interest in accordance with at least one embodiment. The user chooses one or more areas of interest by highlighting one or more user-related information fields available in the electronic document 200. This is further explained in detail in conjunction with FIG. 4.

Figure 2C:
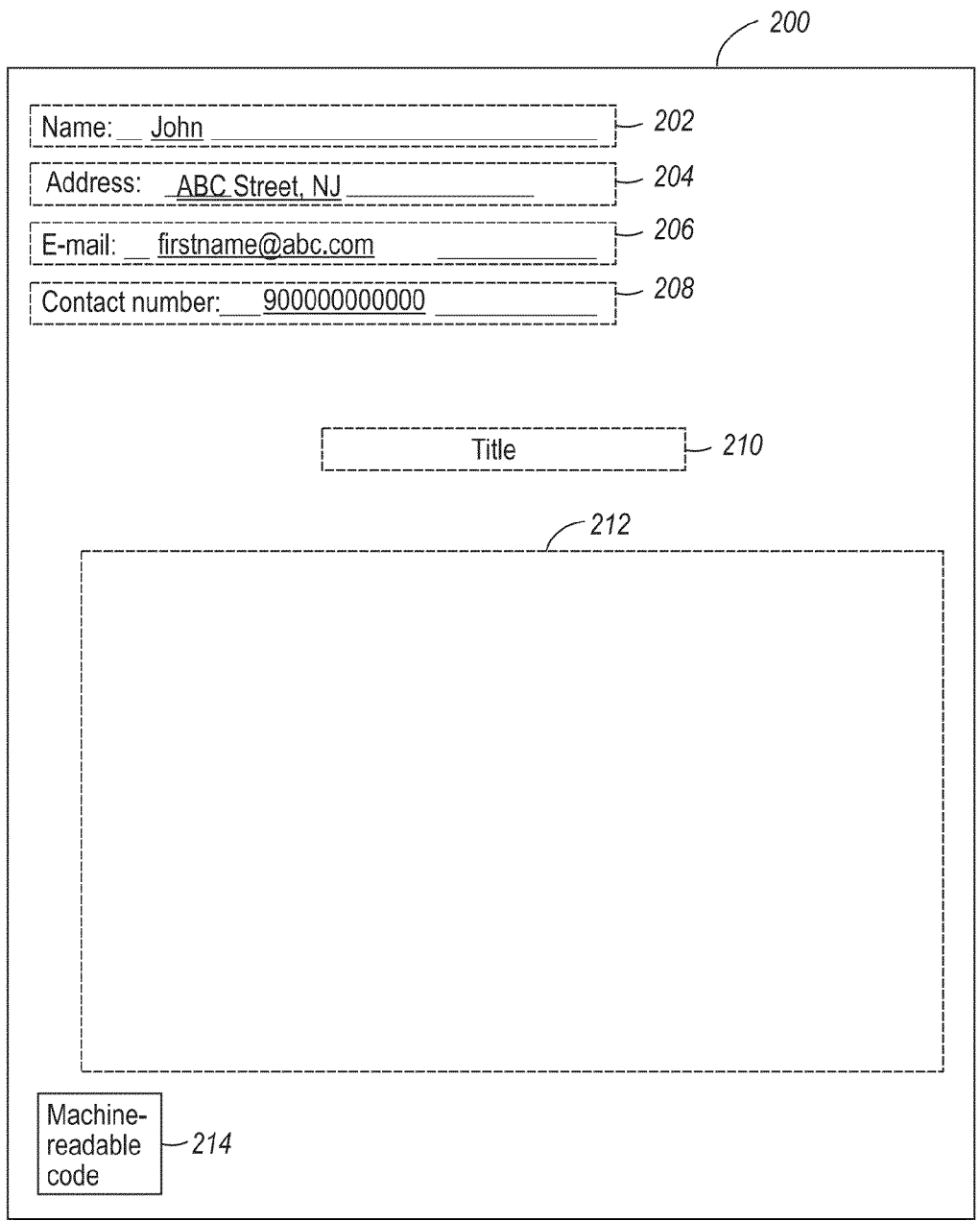
FIG. 2C depicts a layout of the electronic document containing machine-readable code (MRC) in accordance with at least one embodiment.

FIG. 2C depicts a layout of the electronic document containing the MRC 214 in accordance with at least one embodiment. The MRC 214 is generated based on the coordinate locations and embedded at a suitable position in the electronic document 200. This is further explained in detail in conjunction with FIG. 4.

Figure 3:
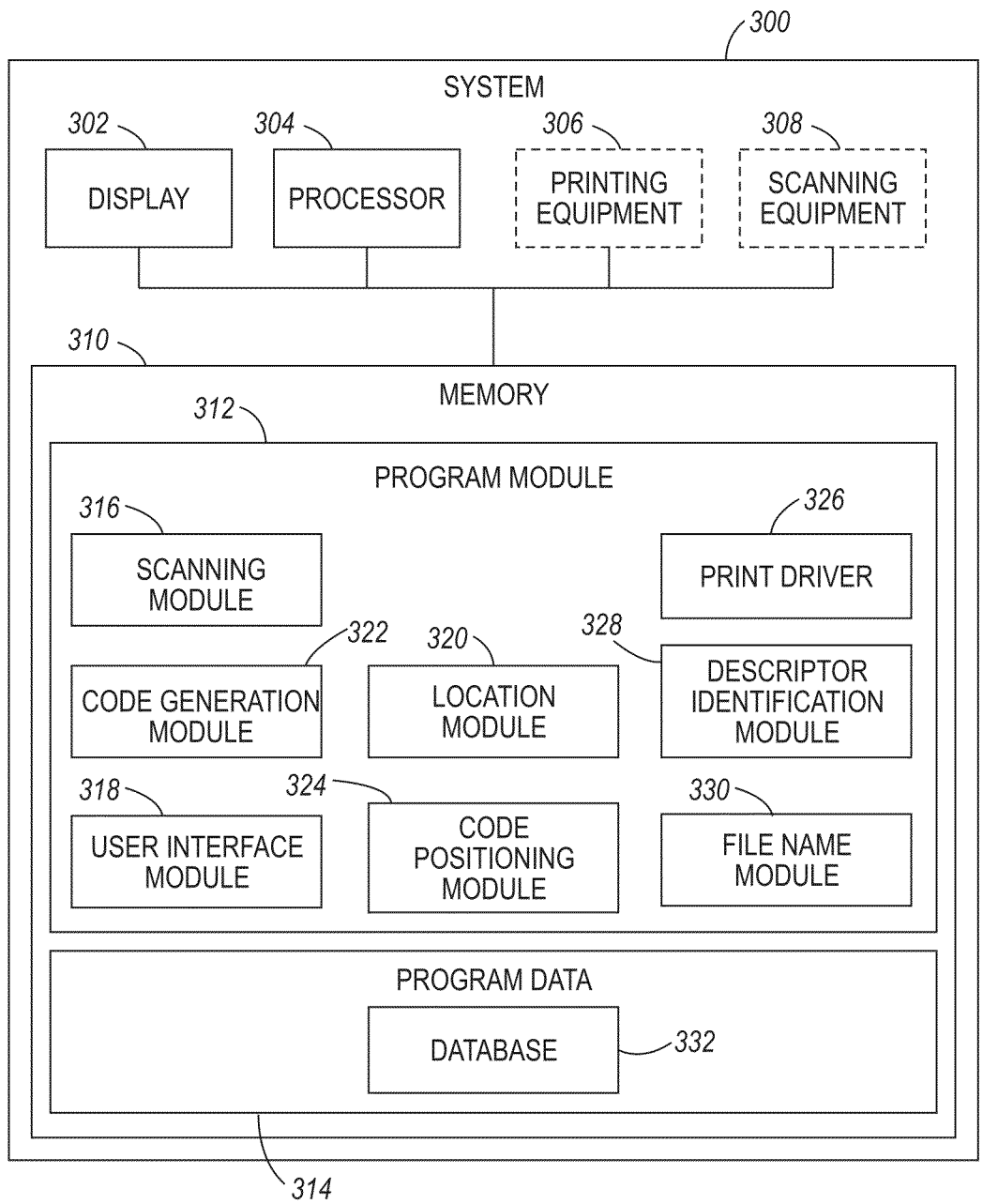
FIG. 3 is a block diagram illustrating a system in accordance with at least one embodiment.

FIG. 3 is a block diagram illustrating a system 300 in accordance with at least one embodiment. The system 300 corresponds to any of the desktop computer 104a, the laptop 104b, or the MFD 104c. The system 300 includes a display 302, a processor 304, printing equipment 306 (optional), scanning equipment 308 (optional), one or more input medium (not shown) and a memory 310. For example, if the system 300 corresponds to the desktop computer 104a or the laptop 104b, the scanning equipment 308 and/or the printing equipment 306 may not be present. If the system 300 corresponds to the MFD 104c, the scanning equipment 308 and/or the printing equipment 306 are present.

The display 302 facilitates the user to view information and interact with the system 300 in conjunction with various input mediums (not shown). The display 302 can be realized through several known technologies, such as Cathode Ray Tube (CRT) based display, Liquid Crystal Display (LCD), Light Emitting Diode (LED)-based display, Organic LED display technology, and Retina Display technology. Further, the display 302 can be a touch screen that receives a user input.

The processor 304 is coupled to the display 302, the printing equipment 306, the scanning equipment 308, one or more input mediums, and the memory 310. The processor 304 executes a set of instructions stored in the memory 310 to perform one or more operations on the system 300. The processor 304 can be realized through a number of processor technologies known in the art. Examples of the processor 304 include, but are not limited to, X86 processor, RISC processor, ASIC processor, CISC processor, or any other processor. In an embodiment, the processor 304 includes a Graphics Processing Unit (GPU) that executes the set of instruction to perform one or more image processing operations.

In an embodiment, the printing equipment 306 prints the images scanned by the scanning equipment 308. In an embodiment, the printing equipment 306 may receive a command from either of the desktop computer 104a or a laptop 104b to print an image. In an embodiment, the printer 208 may utilize one or more printing technologies, such as, but are not limited to, laser printing, thermal printing, dot matrix printing, and ink-jet printing, to print the images.

In an embodiment, the scanning equipment 308 is an optical device that scans a document to obtain an image of the document. In an embodiment, the scanning equipment 308 may utilize various image capturing techniques such as, but are not limited to, a charge-coupled device (CCD) and a Contact Image Sensor (CIS), to scan the document. In an embodiment, the scanning equipment 308 implements a linear scanning technique. In another embodiment, the scanning equipment 308 implements a two-dimensional scanning technique.

The memory 310 includes a program module 312 and a program data 314. The program module 312 includes one or more program instruction modules such as a scanning module 316, a user interface manager 318, a location module 320, a code generation module 322, a code positioning module 324, a print driver 326, a descriptor identification module 328, and a file name module 330. The program data 314 includes a database 332. In an embodiment, the memory 310 and various modules in the memory 310 function under the control of the processor 304. The processor 304 is operable to execute the one or more program instruction modules (e.g., program instructions of the scanning module 316, the user interface manager 318, the location module 320, the code generation module 322, the code positioning module 324, the print driver 326, the descriptor identification module 328, and the file name module 330).

The memory 310 stores set of instructions and data. Some of the commonly known memory implementations are, but not limited to, a random access memory (RAM), a read only memory (ROM), a hard disk drive (HDD), and a secure digital (SD) card. The program module 312 includes a set of instructions that are executable by the processor 304 to perform specific actions on the system 300. It is understood by a person having ordinary skills in the art that the set of instructions works in conjunction with various hardware of the system 300 to perform various operations. The database 332 stores data submitted from and/or required by the scanning module 316, the user interface manager 318, the location module 320, the code generation module 322, the code positioning module 324, the print driver 326, the descriptor identification module 328, and the file name module 330. In an embodiment, the database 332 can be implemented using technologies including, but not limited to Oracle®, IBM DB2®, Microsoft SQL Server®, Microsoft Access®, PostgreSQL®, MySQL® and SQLite®, and the like.

The scanning module 316 facilitates the scanning of the documents. The scanning module 316 facilitates the compilation of the scanned documents captured by the scanning equipment 308. In an embodiment, the scanning module 316 further facilitates scanning of any document. The scanning module 316 stores the MRC code in the database 332. In an embodiment, the scanning module 316 includes a driver to operate the scanning equipment 308.

The user interface manager 318 is configured to receive inputs from a user through the input mediums. In an embodiment, the user interface manager 318 presents a graphical user interface (GUI) on the display 302. In an embodiment, the one or more electronic documents existing on the system 300 are stored in the database 332 and retrieved by the user interface manager 318. In an embodiment, the user interface manager 318 retrieves the electronic document 200 stored in the database 332 based on the user's selection of the electronic document 200. The user interface manager 318 then displays various editing options, including but not limited to, text highlight option, text bold option, text under line options, options for modifying font size, options for modifying text color, various geometric shapes, and the like, that facilitates the user to define one or more areas of interest in the electronic document 200 received by the user interface manager 318.

The location module 320 is configured to determine one or more location identifiers corresponding to the one or more areas of interest defined (e.g., highlighted) by the user. In an embodiment, the one or more location identifiers include X-Y coordinates corresponding to the highlighted user-information fields in the electronic document 200. The X-Y coordinates in the electronic document are calculated based on the pixel size and location of each of the pixel in the highlighted user-information fields. The location module 320 then stores the identified the location identifies into the database 332.

The code generation module 322 obtains the location identifiers corresponding to the regions of interest. The code generation module 322 is configured to generate the MRC 214 based on the location identifiers. The MRC 214 can be generated by various techniques known in the art, including, but not limited to, 2D barcode VCL components in Delphi or C++ builder applications, J4L components, and Google Chart Tools (Chart API) using HTTP Post or Get methods, an online application/tool like KAYWA, and the like. However, a person having ordinary skill in the art would understand that the techniques mentioned for generating the MRC 214 are for illustrative purposes and any suitable MRC generating technique may be used without departing from the scope of the invention. For example, an MRC 214 (e.g., a QR code) is generated based on the location identifiers corresponding to the regions of interest. The MRC 214 thus generated encodes the one or more location identifiers. Once the MRC 214 is generated, the code generation module 322 stores the MRC 214 in the database 332.

The code positioning module 324 obtains the MRC 214 from the database 332 and embeds the MRC 214 in the electronic document 200. In an embodiment, the code positioning module 324 determines the position of the MRC 214 on the electronic document 200 based on the size of the MRC 214 and empty space available in the electronic document. In another embodiment, a user is asked (through the GUI) to define the position of the MRC 214 in the electronic document. The code positioning module 324 then stores the electronic document 200 with the embedded MRC 214 in the database 332.

The print driver 326 receives a command for printing the electronic document 200 from the user interface manager 318. In an embodiment, the print driver 326 obtains the electronic document 200 with the embedded MRC 214 from the database 332 and facilitates printing of the electronic document 200 with the MRC 214, depending on the user's command for printing the electronic document 200. The print driver 326 then initiates the printing of the electronic document 200 having the MRC 214 through the printing equipment 306. In another embodiment, the print driver 326 receives the electronic document 200 and the MRC 214 separately from the database 332 and the embedding can take place at the time of rasterizing/printing process, wherein the position of the MRC 214 is determined by the code positioning module 324.

The descriptor identification module 328 is configured for identifying one or more descriptors from the electronic document 200 based on the MRC 214. In an embodiment, the descriptor identification module 328 decodes the MRC 214. In order to decode the MRC 214, the descriptor identification module 328 implements various code decoding techniques such as various barcode decoding techniques, QR code decoding techniques, MaxiCode decoding techniques, and the like. Further, the invention is not limited with respect to the use of the decoding techniques. In an embodiment, the descriptor identification module 328 determines the one or more location identifiers based on the decoded MRC. For example, the descriptor identification module 328 determines the coordinates associated with the one or more location identifiers based on the decoded MRC (e.g., a QR code). Further, the descriptor identification module 328 recognizes the text in the text fields corresponding to the one or more location identifiers in order to identify one or more descriptors. For recognizing the text, the descriptor identification module 328 implements an Optical Character Recognition (OCR) technique. For example, the descriptor identification module 328 recognizes a name and email address written in the text fields 202 and 206, respectively. Similarly, other details can also be recognized. The descriptor identification module 328 stores the one or more descriptors in the database 332.

The file name module 330 is configured for assigning a filename to the digital image based on the one or more descriptors. This is further explained in conjunction with FIG. 4.

Figure 4:
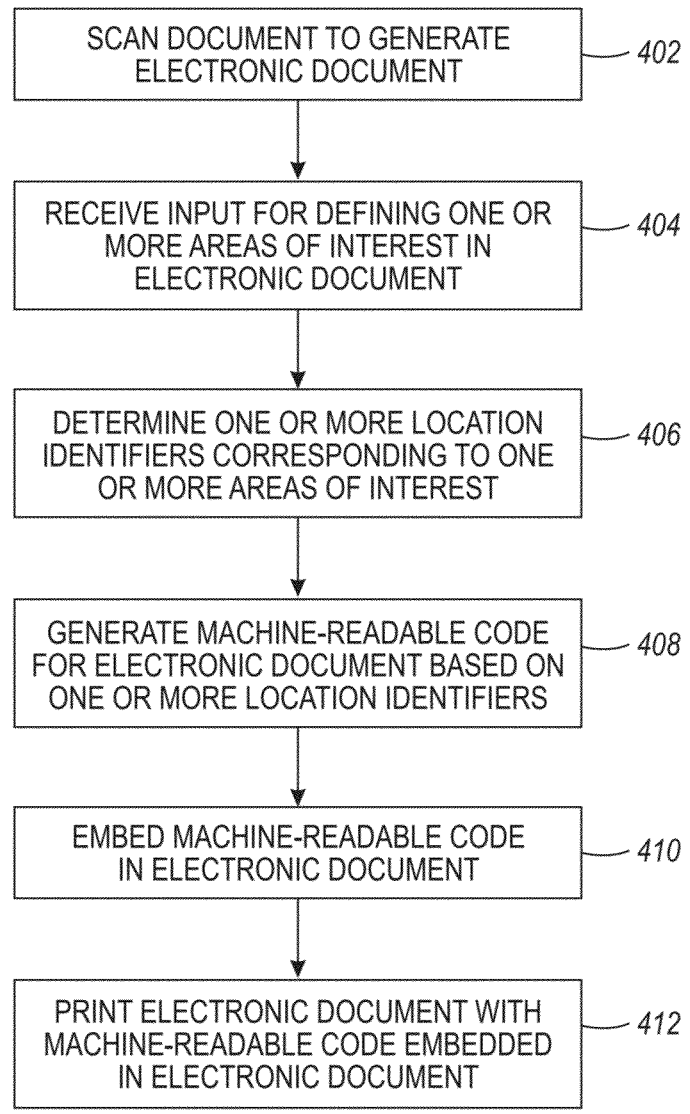
FIG. 4 is a flowchart illustrating a method for generating an MRC in accordance with at least one embodiment.

FIG. 4 is a flowchart illustrating a method for generating the MRC 214 in accordance with at least one embodiment. FIG. 4 is explained in conjunction with FIG. 1, FIGS. 2A, 2B, 2C, and FIG. 3.

At step 402, a document is scanned to generate the electronic document (e.g., scanned document). In an embodiment, the scanning is facilitated by the scanning module 316. In an embodiment, the step 402 is optional. For example, if the user wants to generate the MRC 214 for an existing electronic document (e.g., an electronic document saved on the system 300), there is no need for scanning and, hence, the step 402 can be avoided.

At step 404, an input for defining one or more areas of interest in the electronic document is received. In an embodiment, the input is received by the user interface manager 318 through the GUI displayed on the display 302. The one or more areas of interest include one or more user-related information fields. The areas of interest may be defined by highlighting one or more text fields, by changing the font size, by changing the text color, by underlining the text, or by any suitable noticeable means without departing from the scope of the on-going description. For example, as depicted in FIG. 2B, the user chooses the fields, such as name 202, email 206, and title 210, in the electronic document 200 by highlighting the text inside them.

At step 406, one or more location identifiers are determined corresponding to the one or more areas of interest. In an embodiment, the location identifiers are determined by the location module 320. Instead of checking all the fields on the electronic document 200, only the user-information fields chosen by the user are identified via the coordinates of the chosen user-information fields. For example, for the regions of interests highlighted in FIG. 2B, the identified coordinates of the highlighted field Name 202 are (149, 17, 313, 43). The coordinates represent (X1, Y1) and (X2, Y2) coordinates in the Cartesian system respectively, wherein, (X1, Y1)=(149, 17) and (X2, Y2)=(313, 43). Therefore, X coordinate extends from 149 to 313 while Y coordinate extends from 17 to 43. In an embodiment, the X-Y coordinates for the highlighted regions of interest are calculated based on dots per inch (DPI) of the electronic document to identify size of a single pixel and pixels per inch (PPI) to identify the number of pixels in the electronic document.

Similarly, the coordinates for other highlighted user-information fields, such as field Email 206 and field Title 210 are identified as (167, 60, 256, 67) and (195, 96, 295, 105), respectively. Hence, the area enclosed by (X1, Y1, X2, Y2) includes the text, i.e., user-related information.

At step 408, the MRC 214 is generated for the electronic document 200 by the code generation module 322 based on one or more location identifiers. The MRC 214 includes the coordinate locations of the chosen user-information fields in an encoded format.

At step 410, the MRC is embedded in the electronic document 200. The position where the MRC 214 is placed in the electronic document 200 is determined by the code positioning module 324. Once the position is decided, the MRC is embedded in the electronic document 200. For example, the FIG. 2C depicts the electronic document 200 having the MRC 214 positioned at the bottom.

At step 412, the electronic document 200 is printed with the MRC 214 embedded. In an embodiment, the printing of the electronic document 200 is facilitated by the print driver 326. The electronic document 200 with the MRC 214 enables the user-related information to be encoded in the MRC 214.

For example, the electronic document 200 having the MRC 214 can be an assessment paper to be given to students. Multiple copies of the electronic document 200 having the MRC 214 are printed and provided to the students for filling their personal details and answers to questions contained in the assessment paper. For instance, each student enters the personal details, such as name, class, roll number, subject, and email, on the assessment paper. Also, each student answers the questions asked in the assessment paper in the answer section provided against each question.

At the time of evaluation of the assessment papers, the teacher may require to name each of the assessment papers based on the personal details of the student. Such scenario is described in conjunction with FIG. 5.

Figure 5:
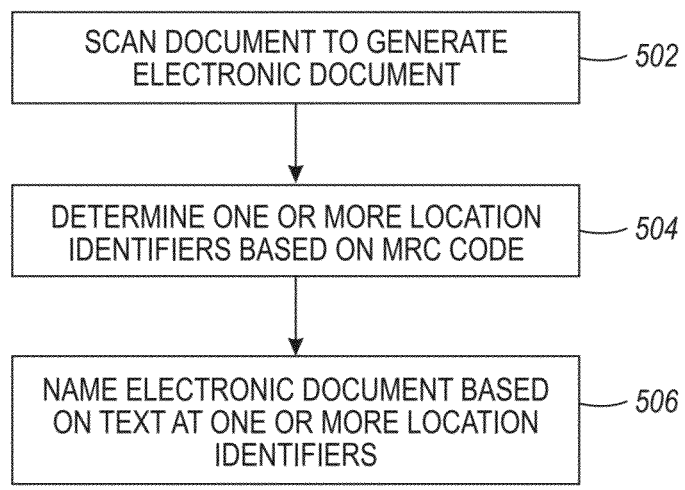
FIG. 5 is a flowchart illustrating a method for assigning a filename to an electronic document in accordance with at least one embodiment.

FIG. 5 is flowchart diagrams illustrating a method for assigning a filename to an electronic document in accordance with at least one embodiment.

At step 502, an assessment paper (e.g., printed document with MRC 214) is scanned to generate an electronic document having the MRC 214. In an embodiment, the scanning module 316 scans the assessment paper.

At step 504, the location (e.g., the coordinates) of the one or more location identifiers is determined based on the MRC code 214. In an embodiment, any suitable MRC decoding technique can be used by the descriptor identification module 328 to decode the MRC. Based on the one or more location identifiers, the descriptor identification module 328 determines one or more text fields corresponding to the one or more location identifiers. The descriptor identification module 328 identifies the text in the one or more text fields through OCR techniques.

Thereafter, at step 506, the electronic document is named based on the one or more identified text. In an embodiment, the file name module 330 determines and assigns the filename to the scanned assessment paper.

For example, the descriptor identification module 328 identifies locations 202, 206, and 210 in the electronic document 200 by decoding the MRC 214. Thereafter, the descriptor identification module 328 performs OCR operation on the text written in the locations 202, 206 and 210 to identify name as 'John', email address as 'firstname@abc.com', and title of the electronic document. The file name module 330 may name the electronic document 200 as 'john-title'. Similarly, any other combination or variation in the filename is also possible depending on the descriptors identified, without departing from the basic scope of the on-going description. However, the scope of the disclosure is not limited to naming the electronic document 200. In an embodiment, the electronic document 200 can be mailed to the author of the electronic document 200. For example, the electronic document 200 is sent to 'John' on e-mail address 'firstname@abc.com'. Further, the subject of the email can be title of the electronic document. Similarly, any such combination of the descriptors can be used for naming or sending the electronic document 200 over an email without departing from the scope of the disclosure.

The disclosed methods and systems, as illustrated in the ongoing description or any of its components, may be embodied in the form of a computer system. Typical examples of a computer system include a general-purpose computer, a programmed microprocessor, a micro-controller, a peripheral integrated circuit element, and other devices, or arrangements of devices that are capable of implementing the steps that constitute the method of the disclosure.

The computer system comprises a computer, an input device, a display unit and the Internet. The computer further comprises a microprocessor. The microprocessor is connected to a communication bus. The computer also includes a memory. The memory may be Random Access Memory (RAM) or Read Only Memory (ROM). The computer system further comprises a storage device, which may be a hard-disk drive or a removable storage drive, such as a floppy-disk drive and an optical-disk drive. The storage device may also be a means of loading computer programs or other instructions into the computer system. The computer system also includes a communication unit. The communication unit allows the computer to connect to other databases and the Internet through an Input/output (I/O) interface, allowing the transfer and reception of data from other databases. The communication unit may include a modem, an Ethernet card, or other similar devices, which enable the computer system to connect to databases and networks, such as LAN, MAN, WAN, and the Internet. The computer system facilitates inputs from a user through input device, accessible to the system through an I/O interface.

The computer system executes a set of instructions, which are stored in one or more storage elements, to process input data. The storage elements may also hold data or other information, as desired. The storage element may be in the form of an information source or a physical memory element present in the processing machine.

The programmable or computer-readable instructions may include various commands that instruct the processing machine to perform specific tasks such as steps that constitute the method of the disclosure. The method and systems described can also be implemented using only software programming or hardware or by a varying combination of the two techniques. The disclosure is independent of the programming language and the operating system used in the computers. The instructions for the disclosure can be written in all the programming languages including, but not limited to, 'C,' 'C++,' 'Visual C++,' and 'Visual Basic.' Further, the software may be in the form of a collection of separate programs, a program module containing a larger program or a portion of a program module, as discussed in the ongoing description. The software may also include modular programming in the form of object-oriented programming. The processing of input data by the processing machine may be in response to user commands, results of previous processing, or a request made by another processing machine. The disclosure can also be implemented in all the operating systems and platforms including, but not limited to, 'Unix,' 'DOS,' 'Android,' 'Symbian;' and 'Linux.'

The programmable instructions can be stored and transmitted on a computer-readable medium. The disclosure can also be embodied in a computer program product comprising a computer-readable medium, or with any product capable of implementing the above methods and systems, or the numerous possible variations thereof.

The method, system, and computer program product, as described above, have numerous advantages. Some of these advantages may include, but are not limited to, time saving and simplicity in operation. Manual intervention for identifying relevant information individually in each electronic document can be avoided resulting in a speedy, yet easy, process. Additionally, the MRC, such as the QR code, serves as an origin or reference for the one or more areas of interest. The decoding of the MRC results in the location identifiers of the defined regions of interest. The decoded information (e.g., the location identifiers obtained by decoding of the MRC) will then be useful for extracting the content from the regions of interest.

Various embodiments of the methods and systems for generating machine-readable codes for electronic documents have been disclosed. However, it should be apparent to those skilled in the art that many more modifications, besides those described, are possible without departing from the inventive concepts herein. The embodiments, therefore, are not to be restricted, except in the spirit of the disclosure. Moreover, in interpreting the disclosure, all terms should be understood in the broadest possible manner consistent with the context. In particular, the terms "comprises" and "comprising" should be interpreted as referring to elements, components, or steps, in a non-exclusive manner, indicating that the referenced elements, components, or steps may be present, or utilized, or combined with other elements, components, or steps that are not expressly referenced.

A person having ordinary skills in the art will appreciate that the system, modules, and sub-modules have been illustrated and explained to serve as examples and should not be considered limiting in any manner. It will be further appreciated that the variants of the above disclosed system elements, or modules, and other features and functions, or alternatives thereof, may be combined to create many other different systems or applications.

Those skilled in the art will appreciate that any of the aforementioned steps and/or system modules may be suitably replaced, reordered, or removed, and additional steps and/or system modules may be inserted, depending on the needs of a particular application. In addition, the systems of the aforementioned embodiments may be implemented using a wide variety of suitable processes and system modules and are not limited to any particular computer hardware, software, middleware, firmware, microcode, etc.

The claims can encompass embodiments for hardware, software, or a combination thereof.

It will be appreciated that variants of the above disclosed, and other features and functions or alternatives thereof, may be combined into many other different systems or applications. Various presently unforeseen or unanticipated alternatives, modifications, variations, or improvements therein may be subsequently made by those skilled in the art, which are also intended to be encompassed by the following claims.

What is claimed is:

1. A method for generating a machine-readable code utilizable for at least one of naming an electronic document or determining one or more attributes of a message, the method comprising:
  receiving an input for defining one or more areas of interest in the electronic document;
  determining one or more location identifiers corresponding to each of the one or more areas of interest;
  generating the machine-readable code for the electronic document, wherein the machine readable code includes information pertaining to the one or more location identifiers; and
  embedding the machine-readable code in the electronic document, wherein the machine-readable code is utilizable for determining each of the one or more location identifiers in the electronic document, wherein text at each of the one or more location identifiers is recognized, wherein the recognized text at the determined one or more location identifiers is used for at least one of naming the electronic document or determining the one or more attributes of the message, wherein the above steps are performed by a processor.

2. The method of claim 1, wherein the machine-readable code comprises at least one of a Universal Product Code (UPC), a high capacity color barcode, a Quick Response (QR) code, or a MaxiCode.

3. The method of claim 1, wherein the one or more location identifiers comprises one or more X-Y coordinates.

4. The method of claim 1 further comprising scanning a document to generate the electronic document.

5. The method of claim 1, wherein the input is received via a Graphical User Interface (GUI).

6. The method of claim 5, wherein the GUI is associated with a print driver.

7. The method of claim 1 further comprising printing the electronic document with the machine-readable code embedded in the electronic document.

8. The method of claim 1, wherein the text at the one or more location identifiers corresponds to at least one of subject matter information, or user-related information.

9. The method of claim 8, wherein the user-related information comprises at least one of an identification number, an email address, contact details, or a residence address.

10. The method of claim 1, wherein the message comprising the electronic document is sent to one or more recipients.

11. The method of claim 10, wherein the one or more attributes comprise at least one of email address of the one or more recipients, subject of the message, or content of the message.

12. The method of claim 1, wherein the embedding is performed at the time of rasterizing.

13. A system to generate a machine-readable code utilizable for at least one of naming an electronic document or determining one or more attributes of a message, the system comprising:
  a memory comprising one or more program instructions modules, wherein the one or more program instructions modules comprise:
  a user interface manager configured to receive an input for defining one or more areas of interest in the electronic document,
  a location module configured to determine one or more location identifiers corresponding to each of the one or more areas of interest,
  a code generation module configured to generate the machine-readable code for the electronic document, wherein the machine readable code includes information pertaining to the one or more location identifiers, and
  a code positioning module configured to embed the machine-readable code in the electronic document, wherein the machine-readable code is utilizable for determining each of the one or more location identifiers in the electronic document, wherein text at each of the one or more location identifiers is recognized, wherein the recognized text at the determined one or more location identifiers is utilized for one of naming the electronic document or determining the one or more attributes of the message; and
  a processor coupled to the memory, wherein the processor is operable to execute the one or more program instruction modules.

14. The system of claim 13, wherein the user interface manager further comprises a Graphical User Interface (GUI) displayable on a display.

15. The system of claim 14, wherein the GUI is associated with a print driver.

16. The system of claim 13, wherein the memory further comprises a scanning module configured to facilitate scanning of a document to generate the electronic document.

17. The system of claim 13, wherein the memory further comprises a file name module configured to utilize the recognized text to name the electronic document.

18. The system of claim 13, wherein the memory further comprises a print driver configured to facilitate printing of the electronic document with the machine-readable code.

19. A non-transitory computer program product for use with a computer, the non-transitory computer program product comprising a computer-readable medium storing a computer-readable program code for generating a machine-readable code utilizable for at least one of naming an electronic document or determining one or more attributes of a message, the computer-readable program code comprising:

program instruction means for receiving an input for defining one or more areas of interest from the electronic document;

program instruction means for determining one or more location identifiers corresponding to each of the one or more areas of interest;

program instruction means for generating the machine-readable code for the electronic document, wherein the machine readable code includes information pertaining to the one or more location identifiers; and program instruction means for embedding the machine-readable code in the electronic document, wherein the machine-readable code is utilizable for determining each of the one or more location identifiers in the electronic document, wherein text at each of the one or more location identifiers is recognized, wherein the recognized text at the determined one or more location identifiers is used for at least one of naming the electronic document or determining the one or more attributes of the message.

\* \* \* \* \*